United States Patent
Sasaki et al.

(10) Patent No.: US 8,345,382 B1
(45) Date of Patent: Jan. 1, 2013

(54) MAGNETIC HEAD FOR PERPENDICULAR MAGNETIC RECORDING HAVING A MAIN POLE AND A SHIELD AND SPECIFICALLY STRUCTURED AND LOCATED COIL ELEMENTS AND MAGNETIC COUPLING LAYERS

(75) Inventors: Yoshitaka Sasaki, Santa Clara, CA (US); Hiroyuki Ito, Milpitas, CA (US); Kazuki Sato, Milpitas, CA (US); Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 68 days.

(21) Appl. No.: 13/156,784

(22) Filed: Jun. 9, 2011

(51) Int. Cl.
*G11B 5/17* (2006.01)
*G11B 5/127* (2006.01)

(52) U.S. Cl. ......... 360/123.06; 360/123.11; 360/125.17; 360/125.27

(58) Field of Classification Search ............ 360/123.02–123.12, 125.02–125.32
See application file for complete search history.

(56) References Cited

U.S. PATENT DOCUMENTS

| | | | |
|---|---|---|---|
| 6,954,340 B2 | 10/2005 | Shukh et al. | |
| 8,077,433 B2 * | 12/2011 | Sasaki et al. | 360/123.15 |
| 2005/0128637 A1 | 6/2005 | Johnston et al. | |

* cited by examiner

*Primary Examiner* — Allen Heinz
(74) *Attorney, Agent, or Firm* — Oliff & Berridge, PLC

(57) ABSTRACT

A magnetic head includes a coil, a main pole, a gap part, a write shield, and a return path section. The return path section includes a yoke part with a first coupling layer connected to the write shield and a second coupling layer magnetically coupling the first coupling layer to the yoke part. The second coupling layer has an end face facing toward a medium facing surface and located away from the medium facing surface. The coil includes i) a first coil element disposed with the first coupling layer interposed between the medium facing surface and the first coil element and ii) a plurality of second coil elements aligned perpendicularly to the medium facing surface and disposed with the second coupling layer interposed between the medium facing surface and the second coil elements. The first coil element being interposed between the main pole and the second coil elements.

8 Claims, 7 Drawing Sheets

MAGNETIC HEAD FOR PERPENDICULAR MAGNETIC RECORDING HAVING A MAIN POLE AND A SHIELD AND SPECIFICALLY STRUCTURED AND LOCATED COIL ELEMENTS AND MAGNETIC COUPLING LAYERS

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that includes a main pole and a shield.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head unit having a magnetoresistive element (hereinafter, also referred to as MR element) for reading and a write head unit having an induction-type electromagnetic transducer for writing are stacked on a substrate. The write head unit includes a main pole that produces a magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head unit of the perpendicular magnetic recording system be smaller in track width and improved in write characteristics such as an overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erase). To increase the recording density, it is required to prevent the occurrence of adjacent track erase.

Providing a write shield near the main pole is effective for preventing the aforementioned skew-induced adjacent track erase and increasing the recording density. For example, U.S. Pat. No. 6,954,340 B2 and U.S. Patent Application Publication No. 2005/0128637 A1 describe a magnetic head including a write shield having an end face that is located in the medium facing surface to wrap around an end face of the main pole.

A magnetic head including a write shield is typically provided with one or more return path sections for connecting the write shield to a part of the main pole away from the medium facing surface. The write shield and the one or more return path sections function to capture a magnetic flux that is produced from the end face of the main pole and that expands in directions other than the direction perpendicular to the plane of the recording medium, and to thereby prevent the magnetic flux from reaching the recording medium. The write shield and the one or more return path sections also function to allow a magnetic flux that has been produced from the end face of the main pole and has magnetized the recording medium to flow back to the main pole. Thus, the magnetic head including the write shield allows prevention of the adjacent track erase and allows a further improvement in recording density.

U.S. Pat. No. 6,954,340 B2 and U.S. Patent Application Publication No. 2005/0128637 A1 describe a magnetic head including, as the aforementioned one or more return path sections, a return path section located forward along the direction of travel of the recording medium (i.e., on the trailing end side) relative to the main pole, and a return path section located backward along the direction of travel of the recording medium (i.e., on the leading end side) relative to the main pole.

Now, consider a structure in which a magnetic layer that forms a return path section is present between the medium facing surface and a coil, and this magnetic layer is exposed over a large area in the medium facing surface. In such a structure, heat generated by the coil may cause the magnetic layer to expand, and this may result in undesirable protrusion of part of the medium facing surface.

To obtain a higher recording density, the frequency of a recording signal is increased. Accordingly, there is a demand for a magnetic head that can achieve a higher rate of change in the direction of the magnetic flux produced from the end face of the main pole. To address this demand, it is effective to reduce the magnetic path length of the return path section.

However, no scheme has been devised to prevent undesirable protrusion of part of the medium facing surface from being caused by a coil and a magnetic layer that forms a return path section, and to reduce the magnetic path length of the return path section.

OBJECT AND SUMMARY OF THE INVENTION

It is an object of the present invention to provide a magnetic head for perpendicular magnetic recording that allows preventing undesirable protrusion of part of the medium facing surface from being caused by a coil and a magnetic layer that forms a return path section, and allows reducing the magnetic path length of the return path section.

A first magnetic head for perpendicular magnetic recording of the present invention includes: a medium facing surface that faces a recording medium; a coil that produces a magnetic field corresponding to data to be written on the recording medium; and a main pole that has an end face located in the medium facing surface. The main pole allows a magnetic flux corresponding to the magnetic field produced by the coil to pass, and produces a write magnetic field for writing the data on the recording medium by means of a perpendicular magnetic recording system. The magnetic head further includes: a write shield made of a magnetic material and having an end face located in the medium facing surface; a gap part made of a nonmagnetic material and provided between the main pole and the write shield; a return path section made of a magnetic material and connecting a part of the main pole away from the medium facing surface to the write shield; and a substrate having a top surface. The coil, the main pole, the write shield, the gap part, and the return path section are disposed above the top surface of the substrate. The end face of the write shield includes a first end face portion that is located forward of the end face of the main pole along the direction of travel of the recording medium. The return path section includes a yoke part, a first coupling layer, and a second coupling layer.

A second magnetic head for perpendicular magnetic recording of the present invention includes: a medium facing surface that faces a recording medium; a coil that produces a magnetic field corresponding to data to be written on the recording medium; and a main pole that has an end face located in the medium facing surface. The main pole allows a magnetic flux corresponding to the magnetic field produced by the coil to pass, and produces a write magnetic field for writing the data on the recording medium by means of a perpendicular magnetic recording system. The magnetic head further includes: a write shield made of a magnetic material and having an end face located in the medium facing surface; a gap part made of a nonmagnetic material and provided between the main pole and the write shield; a first return path section and a second return path section each made of a magnetic material, the first and second return path sections connecting a part of the main pole away from the medium facing surface to the write shield; and a substrate having a top surface. The coil, the main pole, the write shield, the gap part, the first return path section, and the second return path section are disposed above the top surface of the substrate. The end face of the write shield includes a first end face portion that is located forward of the end face of the main pole along the direction of travel of the recording medium. The first return path section and the second return path section are aligned along a direction perpendicular to the top surface of the substrate, with the main pole interposed between the first and second return path sections. At least one of the first and second return path sections includes a yoke part, a first coupling layer, and a second coupling layer.

In the first or second magnetic head of the present invention, the yoke part has a first end face facing toward the medium facing surface and located away from the medium facing surface, and a second end face located away from the medium facing surface and in contact with the main pole. The first coupling layer is connected to the write shield and has an end face located in the medium facing surface. The second coupling layer magnetically couples the first coupling layer to the yoke part, and has an end face facing toward the medium facing surface and located away from the medium facing surface.

In the first or second magnetic head of the present invention, the coil includes a first coil element and a plurality of second coil elements, each of the first and second coil elements extending to pass through a space defined by the main pole, the gap part, the write shield, the first coupling layer, the second coupling layer, and the yoke part. The first coil element is disposed with the first coupling layer interposed between the medium facing surface and the first coil element. The second coil elements are disposed with the second coupling layer interposed between the medium facing surface and the second coil elements, and with the first coil element interposed between the main pole and the second coil elements. The second coil elements are aligned in a direction perpendicular to the medium facing surface.

In the first or second magnetic head of the present invention, in a cross section that intersects the end face of the main pole located in the medium facing surface and that is perpendicular to the medium facing surface and the top surface of the substrate, the second coupling layer may be smaller than the first coupling layer in length in the direction perpendicular to the medium facing surface, and may be greater than the first coupling layer in length in the direction perpendicular to the top surface of the substrate. In this case, in the aforementioned cross section, each of the plurality of second coil elements may be smaller than the first coil element in length in the direction perpendicular to the medium facing surface, and may be greater than the first coil element in length in the direction perpendicular to the top surface of the substrate.

The first or second magnetic head of the present invention may further include an insulating layer made of an inorganic insulating material, the insulating layer including a portion interposed between the end face of the second coupling layer and the medium facing surface.

In the first or second magnetic head of the present invention, the end face of the write shield may further include a second, a third, and a fourth end face portion. The second end face portion may be located backward of the end face of the main pole along the direction of travel of the recording medium. The third and fourth end face portions may be located on opposite sides of the end face of the main pole in the track width direction.

In the first or second magnetic head of the present invention, the end face of the second coupling layer that faces toward the medium facing surface is located away from the medium facing surface. This serves to prevent undesirable protrusion of part of the medium facing surface from being caused by the coil and a magnetic layer that forms a return path section. In the present invention, a single first coil element is disposed with the first coupling layer interposed between the medium facing surface and the first coil element. A plurality of second coil elements are disposed with the second coupling layer interposed between the medium facing surface and the second coil elements, and with the first coil element interposed between the main pole and the second coil elements. The second coil elements are aligned in the direction perpendicular to the medium facing surface. Such a configuration allows the first coil element to be disposed in a narrow space between the main pole and the plurality of second coil elements, while allowing the first coupling layer to be reduced in length in the direction perpendicular to the top surface of the substrate and thereby allowing the end face of the first coupling layer located in the medium facing surface to be reduced in area. Thus, according to the present invention, the space defined by the main pole, the gap part, the write shield, the first coupling layer, the second coupling layer and the yoke part can be efficiently used to dispose the coil. This makes it possible to reduce the magnetic path length of the return path section. Consequently, according to the present invention, it is possible to prevent undesirable protrusion of part of the medium facing surface from being caused by the coil and a magnetic layer that forms a return path section, and also reduce the magnetic path length of the return path section.

Other objects, features and advantages of the present invention will become fully apparent from the following description.

DETAILED DESCRIPTION OF THE PREFERRED EMBODIMENT

Figure 1:
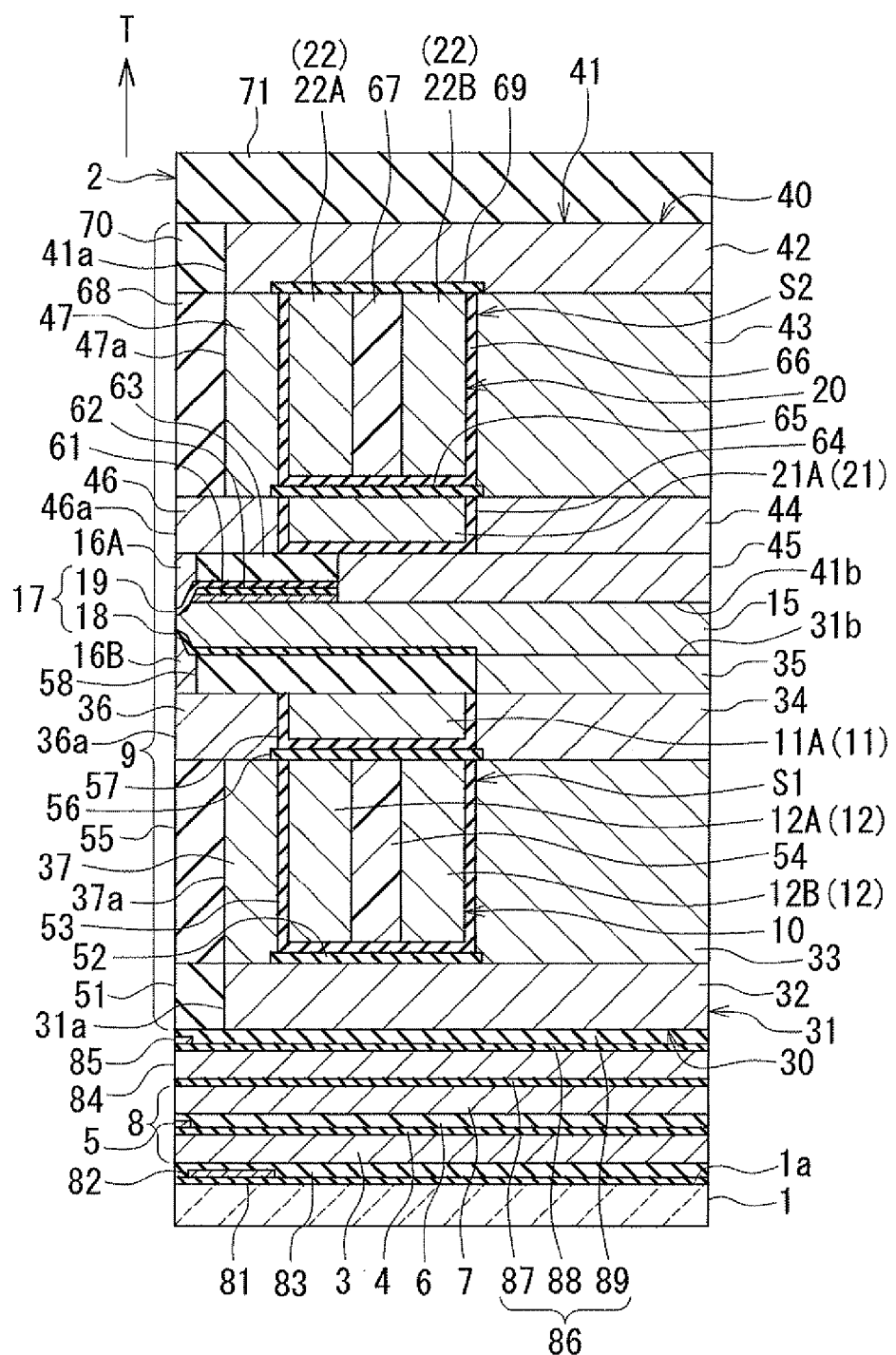
FIG. 1 is a cross-sectional view of a magnetic head according to an embodiment of the invention.
Figure 2:
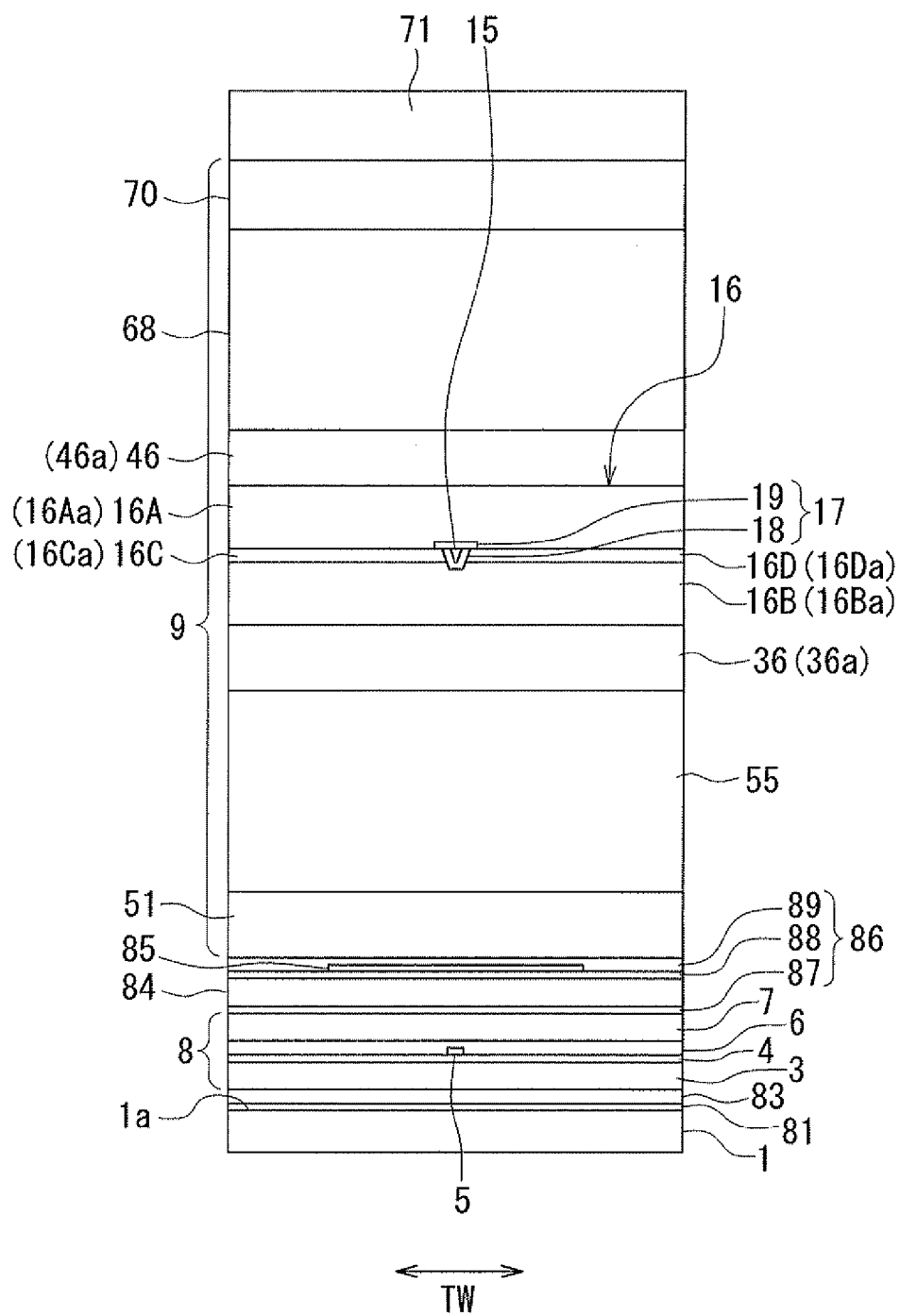
FIG. 2 is a front view showing the medium facing surface of the magnetic head according to the embodiment of the invention.
Figure 3:
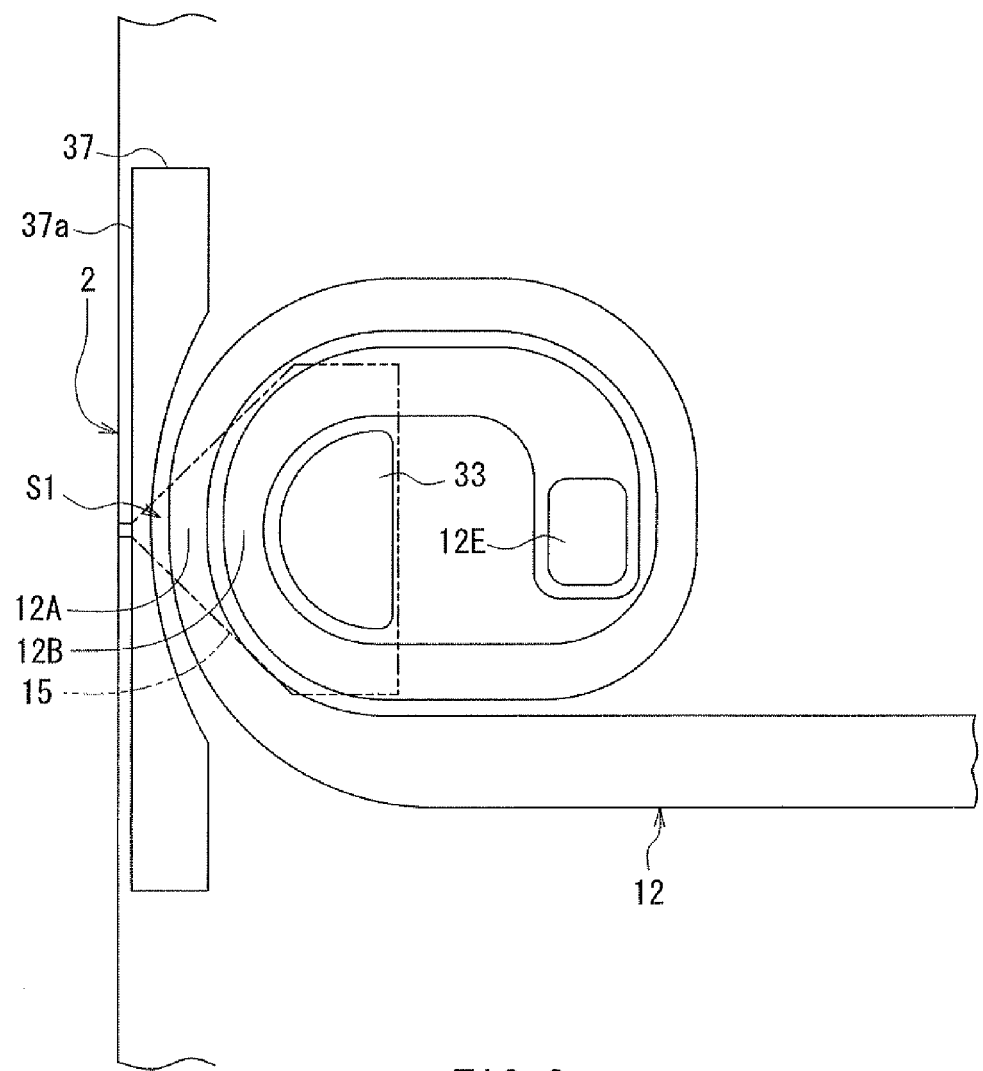
FIG. 3 is a plan view showing a second layer of a first portion of a coil of the magnetic head according to the embodiment of the invention.
Figure 4:
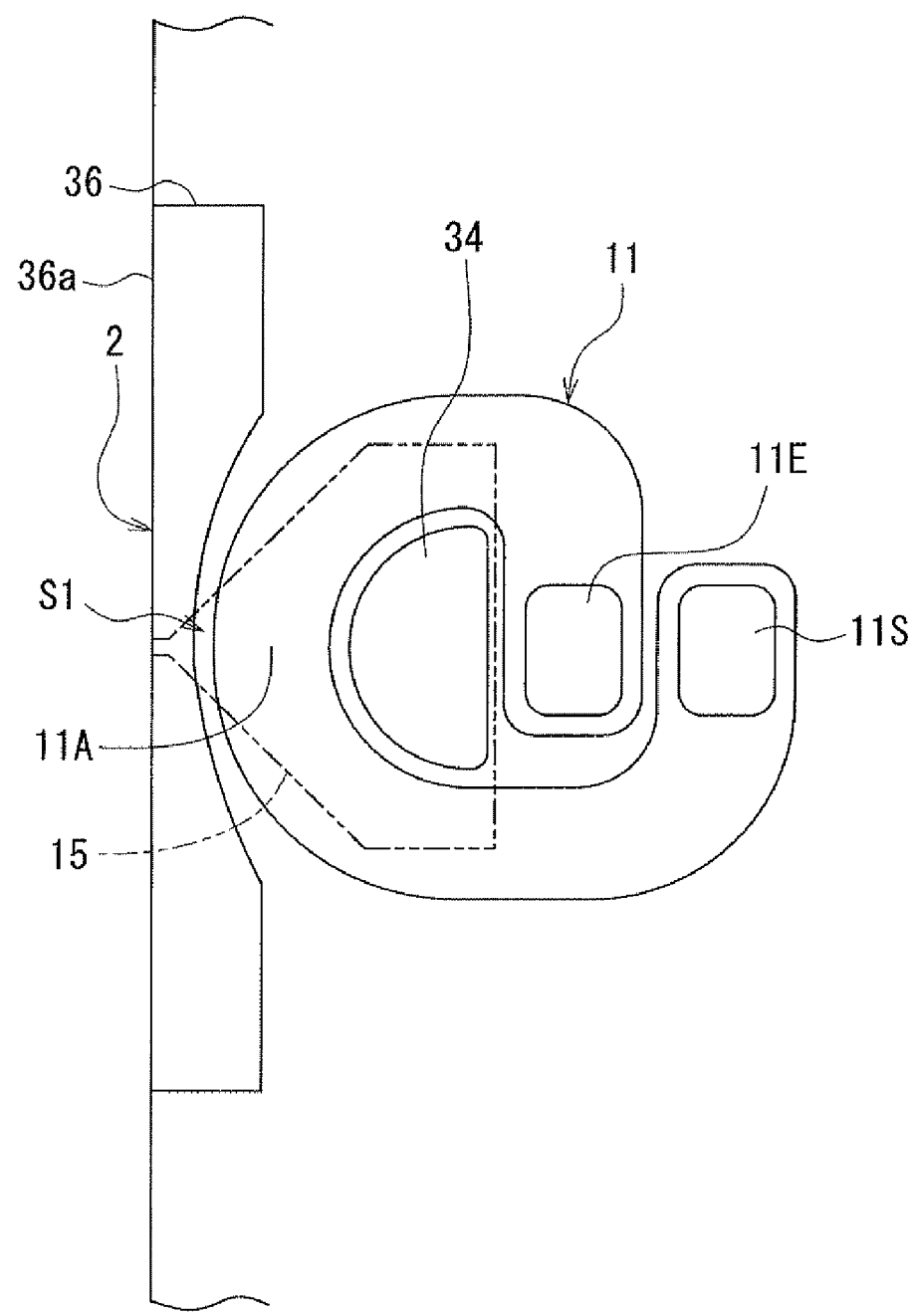
FIG. 4 is a plan view showing a first layer of the first portion of the coil of the magnetic head according to the embodiment of the invention.
Figure 5:
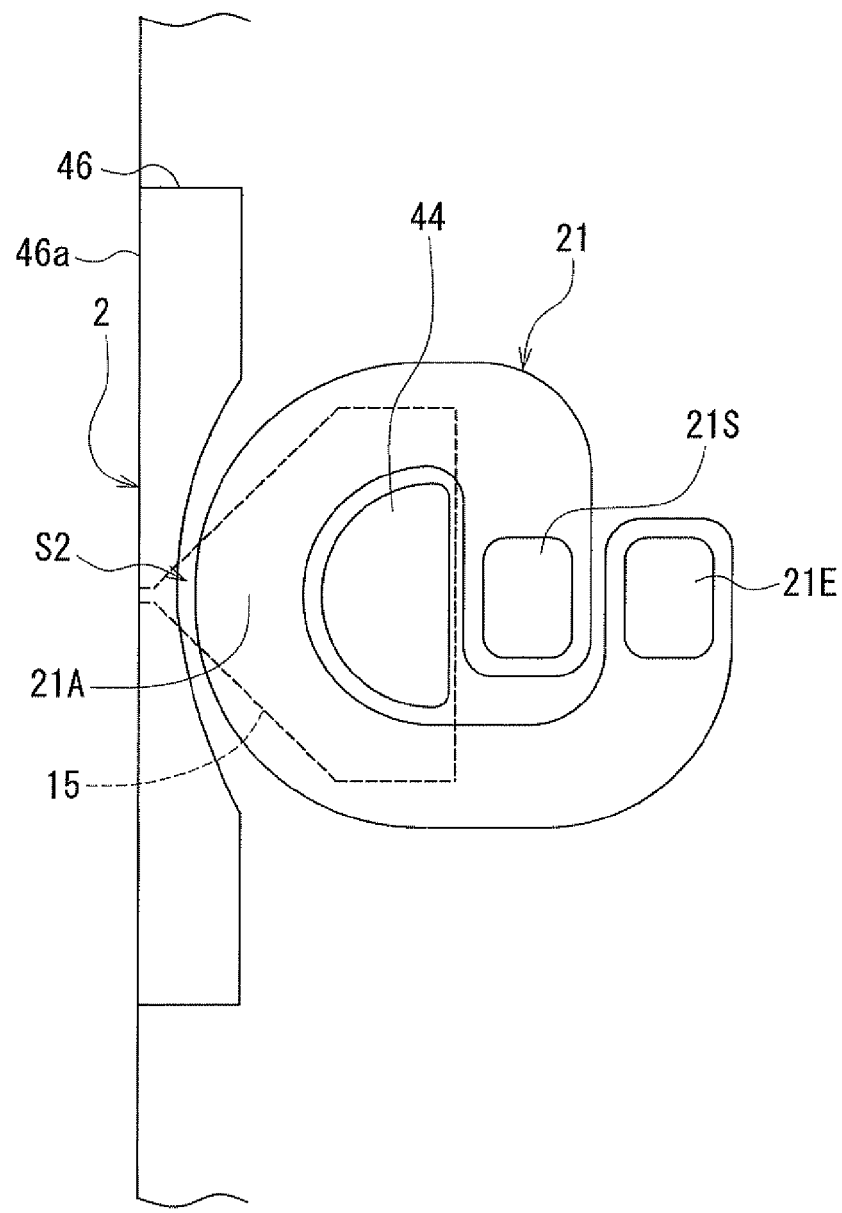
FIG. 5 is a plan view showing a first layer of a second portion of the coil of the magnetic head according to the embodiment of the invention.
Figure 6:
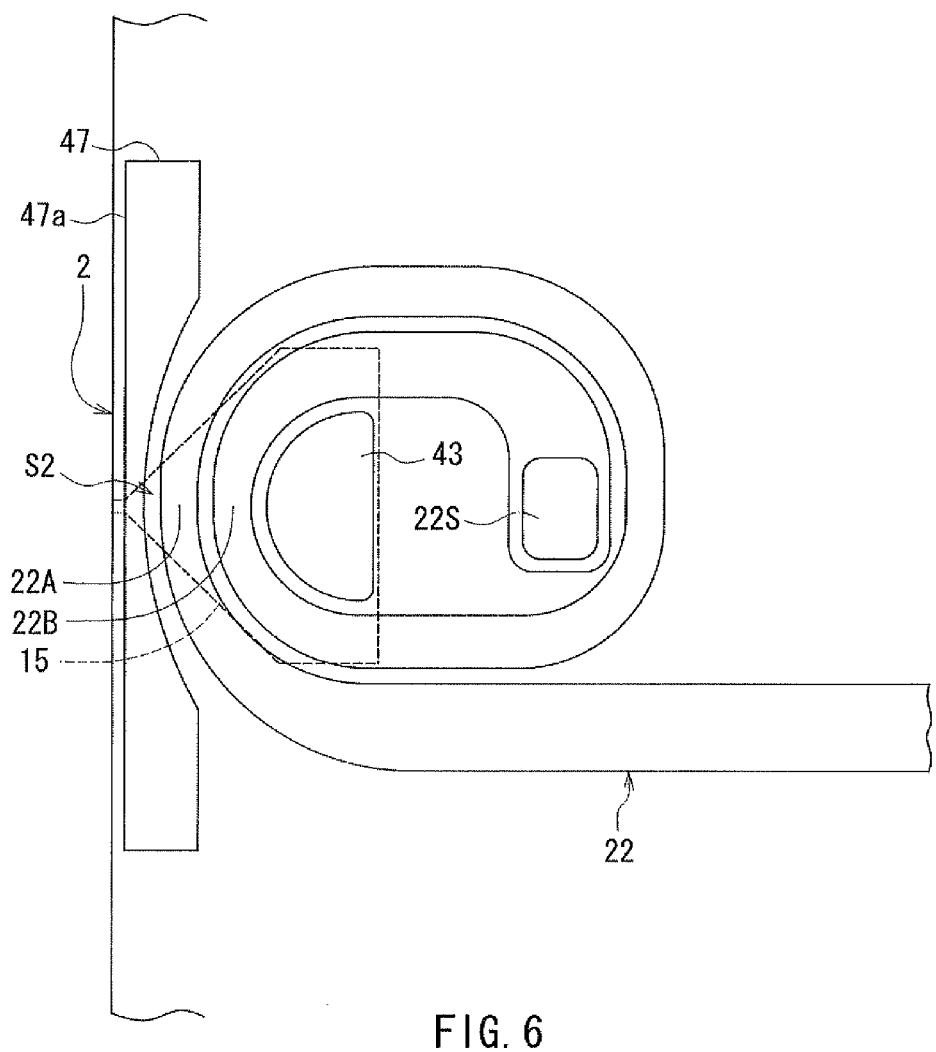
FIG. 6 is a plan view showing a second layer of the second portion of the coil of the magnetic head according to the embodiment of the invention.
Figure 7:
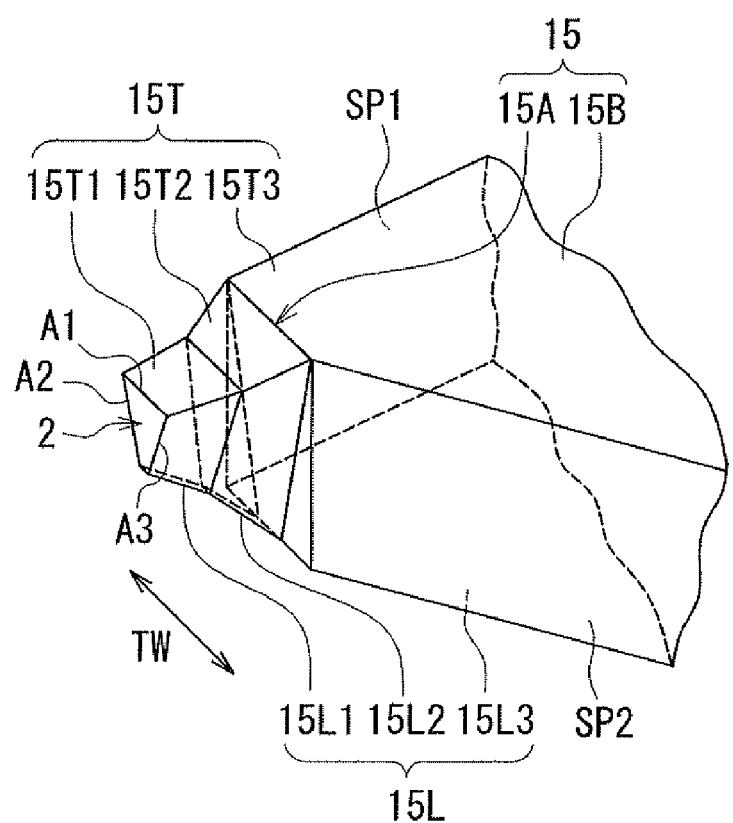
FIG. 7 is a perspective view showing part of a main pole near the medium facing surface in the magnetic head according to the embodiment of the invention.

An embodiment of the present invention will now be described in detail with reference to the drawings. First, reference is made to FIG. 1 to FIG. 7 to describe the configuration of a magnetic head according to the embodiment of the invention. FIG. 1 is a cross-sectional view of the magnetic head according to the embodiment. Note that FIG. 1 shows a cross section perpendicular to the medium facing surface and the top surface of the substrate. The arrow with the symbol T in FIG. 1 indicates the direction of travel of the recording medium. FIG. 2 is a front view showing the medium facing surface of the magnetic head according to the embodiment. FIG. 3 is a plan view showing a second layer of a first portion of a coil of the magnetic head according to the embodiment. FIG. 4 is a plan view showing a first layer of the first portion of the coil of the magnetic head according to the embodiment. FIG. 5 is a plan view showing a first layer of a second portion of the coil of the magnetic head according to the embodiment. FIG. 6 is a plan view showing a second layer of the second portion of the coil of the magnetic head according to the embodiment. FIG. 7 is a perspective view showing part of a main pole near the medium facing surface in the magnetic head according to the embodiment. The arrows with the symbol TW in FIG. 2 and FIG. 7 indicate the track width direction.

As shown in FIG. 1 and FIG. 2, the magnetic head for perpendicular magnetic recording (hereinafter simply referred to as the magnetic head) according to the embodiment includes: a substrate 1 made of a ceramic material such as aluminum oxide-titanium carbide ($Al_2O_3$—TiC) and having a top surface 1a; an insulating layer 81 made of an insulating material and disposed on the top surface 1a of the substrate 1; a heater 82 disposed on the insulating layer 81; and an insulating layer 83 made of an insulating material and disposed to cover the insulating layer 81 and the heater 82. The insulating layers 81 and 83 are made of alumina ($Al_2O_3$), for example. The heater 82 will be described in detail later.

The magnetic head further includes a read head unit 8 disposed forward along the direction T of travel of the recording medium (i.e., on the trailing end side) relative to the heater 82. The read head unit 8 includes: a first read shield layer 3 made of a magnetic material and disposed on the insulating layer 83; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 2 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of layers constituting the GMR element.

The magnetic head further includes: a write head unit 9 disposed forward of the read head unit 8 along the direction T of travel of the recording medium; and an expansion layer 84, a sensor 85, and a nonmagnetic part 86 that are disposed between the read head unit 8 and the write head unit 9. The nonmagnetic part 86 is made of a nonmagnetic material. The material of the nonmagnetic part 86 may be alumina, for example.

The nonmagnetic part 86 includes nonmagnetic layers 87, 88, and 89. The nonmagnetic layer 87 is disposed on the second read shield layer 7. The expansion layer 84 is disposed on the nonmagnetic layer 87. The nonmagnetic layer 88 is disposed to cover the expansion layer 84. The sensor 85 is disposed on the nonmagnetic layer 88. The nonmagnetic layer 89 is disposed to cover the sensor 85.

The write head unit 9 includes a coil, a main pole 15, a write shield 16, and a gap part 17. The coil produces a magnetic field corresponding to data to be written on the recording medium. The coil includes a first portion 10 and a second portion 20. The first portion 10 and the second portion 20 are both made of a conductive material such as copper. The first portion 10 and the second portion 20 are connected in series or in parallel. The main pole 15 has an end face located in the medium facing surface 2. The main pole 15 allows a magnetic flux corresponding to the magnetic field produced by the coil to pass, and produces a write magnetic field for writing data on the recording medium by means of a perpendicular magnetic recording system. FIG. 1 shows a cross section that intersects the end face of the main pole 15 located in the medium facing surface 2 and that is perpendicular to the medium facing surface 2 and the top surface 1a of the substrate 1 (this cross section will hereinafter be referred to as the main cross section).

The first portion 10 includes a first layer 11 that is located backward of the main pole 15 along the direction T of travel of the recording medium, and a second layer 12 that is located backward of the first layer 11 along the direction T of travel of the recording medium. The second portion 20 includes a first layer 21 that is located forward of the main pole 15 along the direction T of travel of the recording medium, and a second layer 22 that is located forward of the first layer 21 along the direction T of travel of the recording medium.

The write shield 16 has an end face located in the medium facing surface 2. The end face of the write shield 16 includes first to fourth end face portions 16Aa, 16Ba, 16Ca, and 16Da. The first end face portion 16Aa is located forward of the end face of the main pole 15 along the direction T of travel of the recording medium. The second end face portion 16Ba is located backward of the end face of the main pole 15 along the direction T of travel of the recording medium. The third and fourth end face portions 16Ca and 16Da are located on opposite sides of the end face of the main pole 15 in the track width direction TW. In the medium facing surface 2, the first to fourth end face portions 16Aa, 16Ba, 16Ca, and 16Da are arranged to wrap around the end face of the main pole 15.

The write shield 16 is made of a magnetic material. Examples of materials that can be used for the write shield 16 include CoFeN, CoNiFe, NiFe, and CoFe.

The write head unit 9 further includes a first return path section 30 and a second return path section 40. The first and second return path sections 30 and 40 are both made of a magnetic material. Examples of materials that can be used for the first and second return path sections 30 and 40 include CoFeN, CoNiFe, NiFe, and CoFe. The first return path section 30 and the second return path section 40 are aligned along the direction perpendicular to the top surface 1a of the substrate 1, with the main pole 15 interposed between the first and second return path sections 30 and 40. The first return path section 30 is located backward of the main pole 15 along the direction T of travel of the recording medium and is in contact with the write shield 16 and the main pole 15, thereby magnetically coupling the write shield 16 and the main pole 15 to each other. The second return path section 40 is located forward of the main pole 15 along the direction T of travel of the recording medium and is in contact with the write shield 16 and the main pole 15, thereby magnetically coupling the write shield 16 and the main pole 15 to each other.

The first return path section 30 includes a yoke part 31, a first coupling layer 36, and a second coupling layer 37. The yoke part 31 has a first end face 31a facing toward the medium facing surface 2 and located away from the medium facing surface 2, and a second end face 31b located away from the medium facing surface 2 and in contact with the main pole 15. The first coupling layer 36 is connected to the write shield 16. The second coupling layer 37 magnetically couples the first coupling layer 36 to the yoke part 31.

The second return path section 40 includes a yoke part 41, a first coupling layer 46, and a second coupling layer 47. The yoke part 41 has a first end face 41a facing toward the medium facing surface 2 and located away from the medium facing surface 2, and a second end face 41b located away from the medium facing surface 2 and in contact with the main pole 15. The first coupling layer 46 is connected to the write shield 16. The second coupling layer 47 magnetically couples the first coupling layer 46 to the yoke part 41.

The yoke part 31 of the first return path section 30 includes magnetic layers 32 to 35. The magnetic layer 32 is located on the nonmagnetic layer 89. The magnetic layer 32 has an end face facing toward the medium facing surface 2 and located away from the medium facing surface 2. The end face of the magnetic layer 32 also serves as the first end face 31a of the yoke part 31.

The magnetic head further includes an insulating layer 51 made of an insulating material, disposed on the nonmagnetic layer 89 and surrounding the magnetic layer 32. The top surfaces of the magnetic layer 32 and the insulating layer 51 are even with each other. The magnetic head further includes an insulating layer 52 made of an insulating material and disposed on part of the top surfaces of the magnetic layer 32 and the insulating layer 51. The insulating layers 51 and 52 are made of alumina, for example.

Both the second coupling layer 37 and the magnetic layer 33 are disposed on the magnetic layer 32. The second coupling layer 37 is located near the medium facing surface 2 and has an end face 37a. The end face 37a faces toward the medium facing surface 2 and is located at a distance from the medium facing surface 2. The magnetic layer 33 is located farther from the medium facing surface 2 than is the second coupling layer 37. As shown in FIG. 3, the second layer 12 of the first portion 10 of the coil is wound approximately two turns around the magnetic layer 33.

The magnetic head further includes: an insulating film 53 made of an insulating material and interposed between the second layer 12 and each of the second coupling layer 37, the magnetic layer 33 and the insulating layer 52; an insulating layer 54 made of an insulating material and disposed between the turns of the second layer 12; and an insulating layer 55 made of an insulating material and disposed around the second layer 12 and the second coupling layer 37. The top surfaces of the second layer 12, the second coupling layer 37, the magnetic layer 33, the insulating film 53 and the insulating layers 54 and 55 are even with each other. The magnetic head further includes an insulating layer 56 made of an insulating material and disposed to cover the second layer 12 and the insulating layer 54. The insulating film 53 and the insulating layer 56 are made of alumina, for example. The insulating layer 54 is made of photoresist, for example. In this embodiment, the insulating layer 55 is particularly made of an inorganic insulating material that has a smaller coefficient of linear thermal expansion and a higher Vickers hardness than those of the magnetic material used to form the second coupling layer 37. Alumina is an example of such an inorganic insulating material.

The first coupling layer 36 lies over the second coupling layer 37 and the insulating layer 55, and has an end face 36a located in the medium facing surface 2. The magnetic layer 34 is located on the magnetic layer 33. As shown in FIG. 4, the first layer 11 of the first portion 10 of the coil is wound one turn around the magnetic layer 34.

The magnetic head further includes: an insulating film 57 made of an insulating material and interposed between the first layer 11 and each of the first coupling layer 36, the magnetic layer 34 and the insulating layer 56; and a not-shown insulating layer made of an insulating material and disposed around the first layer 11 and the first coupling layer 36. The insulating film 57 and the not-shown insulating layer are made of alumina, for example. The top surfaces of the first layer 11, the first coupling layer 36, the magnetic layer 34, the insulating film 57, and the not-shown insulating layer are even with each other.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located forward of the main pole 15 along the direction T of travel of the recording medium. The second shield 16B is located backward of the main pole 15 along the direction T of travel of the recording medium. The side shields 16C and 16D magnetically couple the first shield 16A and the second shield 16B to each other.

The first shield 16A has the first end face portion 16Aa. The second shield 16B has the second end face portion 16Ba. The side shield 16C has the third end face portion 16Ca. The side shield 16D has the fourth end face portion 16Da.

The second shield 16B is disposed on the first coupling layer 36. The magnetic layer 35 is disposed on the magnetic layer 34. The magnetic layer 35 has a top surface that is in contact with the main pole 15. The top surface of the magnetic layer 35 also serves as the second end face 31b of the yoke part 31.

The magnetic head further includes an insulating layer 58 made of an insulating material. The insulating layer 58 is disposed over part of the top surfaces of the first layer 11, the first coupling layer 36 and the not-shown insulating layer and surrounds the second shield 16B and the magnetic layer 35. The insulating layer 58 is made of alumina, for example.

The main pole 15 has: a bottom end 15L which is an end closer to the top surface 1a of the substrate 1; a top surface 15T opposite to the bottom end 15L; and first and second side parts SP1 and SP2 that are opposite to each other in the track width direction TW. The side shield 16C has a first sidewall that is opposed to the first side part SP1 of the main pole 15. The side shield 16D has a second sidewall that is opposed to the second side part SP2 of the main pole 15.

The gap part 17 is made of a nonmagnetic material and disposed between the main pole 15 and the write shield 16. The gap part 17 includes a first gap layer 18 and a second gap layer 19. The first gap layer 18 is disposed between the main pole 15 and the second shield 16B and between the main pole 15 and the side shields 16C and 16D. The second gap layer 19 is disposed between the main pole 15 and the first shield 16A.

The side shields 16C and 16D are disposed on the second shield 16B and in contact with the top surface of the second shield 16B. The first gap layer 18 is arranged to extend along the sidewalls of the side shields 16C and 16D, the top surface of the second shield 16B, and the top surface of the insulating layer 58. The first gap layer 18 is made of a nonmagnetic material. The nonmagnetic material used to form the first gap layer 18 may be an insulating material or a nonmagnetic metal material. Alumina is an example of insulating materials that can be used to form the first gap layer 18. Ru is an example of nonmagnetic metal materials that can be used to form the first gap layer 18. The first gap layer 18 has an opening for exposing the top surface of the magnetic layer 35.

The main pole 15 is disposed over the second shield 16B and the insulating layer 58, with the first gap layer 18 interposed between the main pole 15 and the top surfaces of the second shield 16B and the insulating layer 58. As shown in FIG. 2, the first gap layer 18 is interposed also between the main pole 15 and the side shields 16C and 16D.

The bottom end 15L of the main pole 15 is in contact with the top surface of the magnetic layer 35, i.e., the second end face 31b of the yoke part 31, at a position away from the medium facing surface 2. The main pole 15 is made of a magnetic metal material. Examples of materials that can be used for the main pole 15 include NiFe, CoNiFe, and CoFe. A detailed description will be given later as to the shape of the main pole 15.

The magnetic head further includes a not-shown nonmagnetic layer made of a nonmagnetic material and disposed around the main pole 15, the second shield 16B and the side shields 16C and 16D. In this embodiment, the not-shown nonmagnetic layer is made of a nonmagnetic insulating material such as alumina, in particular.

The magnetic head further includes: a nonmagnetic metal layer 61 made of a nonmagnetic metal material and disposed on part of the top surface 15T of the main pole 15 at a position away from the medium facing surface 2; and an insulating layer 62 made of an insulating material and disposed on the top surface of the nonmagnetic metal layer 61. The nonmagnetic metal layer 61 is made of Ru, NiCr, or NiCu, for example. The insulating layer 62 is made of alumina, for example.

The second gap layer 19 is disposed to cover the main pole 15, the nonmagnetic metal layer 61, and the insulating layer 62. The second gap layer 19 is made of a nonmagnetic material. Examples of materials that can be used for the second gap layer 19 include nonmagnetic insulating materials such as alumina, and nonmagnetic conductive materials such as Ru, NiCu, Ta, W, NiB, and NiP.

The first shield 16A is disposed over the side shields 16C and 16D and the second gap layer 19, and is in contact with the top surfaces of the side shields 16C and 16D and the second gap layer 19. In the medium facing surface 2, part of the end face of the first shield 16A is located at a predetermined distance from the end face of the main pole 15, the distance being created by the thickness of the second gap layer 19. The thickness of the second gap layer 19 preferably falls within the range of 5 to 60 nm, and may be 30 to 60 nm, for example. The end face of the main pole 15 has a side that is adjacent to the second gap layer 19, and the side defines the track width.

The yoke part 41 of the second return path section 40 includes magnetic layers 42 to 45. The magnetic layer 45 is located on the main pole 15 at a position away from the medium facing surface 2. The magnetic layer 45 has a bottom surface that is in contact with the top surface 15T of the main pole 15. The bottom surface of the magnetic layer 45 also serves as the second end face 41b of the yoke part 41.

The magnetic head further includes a nonmagnetic layer 63 disposed around the first shield 16A and the magnetic layer 45. The nonmagnetic layer 63 is made of an inorganic insulating material, for example. Examples of the inorganic insulating material include alumina and silicon oxide. The top surfaces of the first shield 16A, the magnetic layer 45 and the nonmagnetic layer 63 are even with each other.

The first coupling layer 46 lies over the first shield 16A and the nonmagnetic layer 63, and has an end face 46a located in the medium facing surface 2. The magnetic layer 44 is located on the magnetic layer 45. As shown in FIG. 5, the first layer 21 of the second portion 20 of the coil is wound one turn around the magnetic layer 44.

The magnetic head further includes: an insulating film 64 made of an insulating material and interposed between the first layer 21 and each of the first coupling layer 46, the magnetic layers 44 and 45 and the nonmagnetic layer 63; and a not-shown insulating layer made of an insulating material and disposed around the first layer 21 and the first coupling layer 46. The top surfaces of the first layer 21, the first coupling layer 46, the magnetic layer 44, the insulating film 64, and the not-shown insulating layer are even with each other. The magnetic head further includes an insulating layer 65 made of an insulating material and disposed to cover the first layer 21. The insulating film 64, the insulating layer 65, and the not-shown insulating layer are made of alumina, for example.

The second coupling layer 47 lies over the first coupling layer 46, and has an end face 47a. The end face 47a faces toward the medium facing surface 2 and is located away from the medium facing surface 2. The magnetic layer 43 is located on the magnetic layer 44. As shown in FIG. 6, the second layer 22 of the second portion 20 of the coil is wound approximately two turns around the magnetic layer 43.

The magnetic head further includes: an insulating film 66 made of an insulating material and interposed between the second layer 22 and each of the second coupling layer 47, the magnetic layer 43 and the insulating layer 65; an insulating layer 67 made of an insulating material and disposed between the turns of the second layer 22; and an insulating layer 68 made of an insulating material and disposed around the second layer 22 and the second coupling layer 47. The top surfaces of the second layer 22, the second coupling layer 47, the magnetic layer 43, the insulating film 66 and the insulating layers 67 and 68 are even with each other. The magnetic head further includes an insulating layer 69 made of an insulating material and disposed to cover the second layer 22 and the insulating layer 67. The insulating film 66 and the insulating layer 69 are made of alumina, for example. The insulating layer 67 is made of photoresist, for example. In this embodiment, the insulating layer 68 is particularly made of an inorganic insulating material that has a smaller coefficient of linear thermal expansion and a higher Vickers hardness than those of the magnetic material used to form the second coupling layer 47. Alumina is an example of such an inorganic insulating material.

The magnetic layer 42 is disposed over the second coupling layer 47, the magnetic layer 43 and the insulating layer 69, and connects the second coupling layer 47 and the magnetic layer 43 to each other. The magnetic layer 42 has an end face facing toward the medium facing surface 2 and located away from the medium facing surface 2. The end face of the magnetic layer 42 also serves as the first end face 41a of the yoke part 41.

The magnetic head further includes an insulating layer 70 made of an insulating material and disposed around the magnetic layer 42. The insulating layer 70 is made of alumina, for example. The top surfaces of the magnetic layer 42 and the insulating layer 70 are even with each other.

The magnetic head further includes a protection layer 71 made of a nonmagnetic material and disposed to cover the write head unit 9. The protection layer 71 is made of, for example, an inorganic insulating material such as alumina.

As has been described, the magnetic head according to this embodiment includes the medium facing surface 2, the read head unit 8, and the write head unit 9. The medium facing surface 2 faces the recording medium. The read head unit 8 and the write head unit 9 are stacked on the substrate 1. Relative to the write head unit 9, the read head unit 8 is disposed backward along the direction T of travel of the recording medium (i.e., disposed on the leading end side).

The read head unit 8 includes: the MR element 5 serving as a read element; the first read shield layer 3 and the second read shield layer 7 for shielding the MR element 5, with their respective portions near the medium facing surface 2 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head unit 9 includes the coil including the first and second portions 10 and 20, the main pole 15, the write shield 16, the gap part 17, and the first and second return path sections 30 and 40. The write shield 16 includes the first shield 16A, the second shield 16B, and the two side shields 16C and 16D. The gap part 17 includes the first gap layer 18 and the second gap layer 19. The first return path section 30 and the second return path section 40 are aligned along the direction perpendicular to the top surface 1a of the substrate 1, with the main pole 15 interposed between the first and second return path sections 30 and 40.

The first return path section 30 is made of a magnetic material and is located backward of the main pole 15 along the direction T of travel of the recording medium. The first return path section 30 includes the yoke part 31, the first coupling layer 36, and the second coupling layer 37. The yoke part 31 includes the magnetic layers 32 to 35. The yoke part 31 has the second end face 31b that is located away from the medium facing surface 2 and in contact with the main pole 15.

As shown in FIG. 1, the first return path section 30 connects the write shield 16 and the main pole 15 to each other so that a first space S1 is defined by the main pole 15, the gap part 17 (the gap layer 18), the write shield 16, the first coupling layer 36, the second coupling layer 37 and the yoke part 31 (the magnetic layers 32 to 35), and thereby magnetically couples the write shield 16 and the main pole 15 to each other.

The first and second coupling layers 36 and 37 magnetically couple the second shield 16B of the write shield 16 to the yoke part 31 (the magnetic layer 32). In this embodiment, the first coupling layer 36 is connected to the second shield 16B. The second coupling layer 37 magnetically couples the first coupling layer 36 to the yoke part 31 (the magnetic layer 32). The first coupling layer 36 has the end face 36a that is located in the medium facing surface 2 at a position backward of the second end face portion 16Ba of the second shield 16B along the direction T of travel of the recording medium. In the main cross section, the magnetic layer 32 is greater than the second shield 16B in length in the direction perpendicular to the medium facing surface 2. In the main cross section, each of the first and second coupling layers 36 and 37 is greater than the second shield 16B and smaller than the magnetic layer 32 in length in the direction perpendicular to the medium facing surface 2. In the main cross section, the second coupling layer 37 is smaller than the first coupling layer 36 in length in the direction perpendicular to the medium facing surface 2, and is greater than the first coupling layer 36 in length in the direction perpendicular to the top surface 1a of the substrate 1.

Neither the second coupling layer 37 nor the magnetic layer 32 is exposed in the medium facing surface 2. The second coupling layer 37 has the end face 37a facing toward the medium facing surface 2 and located away from the medium facing surface 2. The magnetic layer 32 has an end face (the first end face 31a of the yoke part 31) facing toward the medium facing surface 2 and located away from the medium facing surface 2. Part of the insulating layer 55 is interposed between the end face 37a of the second coupling layer 37 and the medium facing surface 2. Part of the insulating layer 51 is interposed between the aforementioned end face of the magnetic layer 32 (the first end face 31a of the yoke part 31) and the medium facing surface 2.

The second return path section 40 is made of a magnetic material and is located forward of the main pole 15 along the direction T of travel of the recording medium. The second return path section 40 includes the yoke part 41, the first coupling layer 46, and the second coupling layer 47. The yoke part 41 includes the magnetic layers 42 to 45. The yoke part 41 has the second end face 41b that is located away from the medium facing surface 2 and in contact with the main pole 15.

As shown in FIG. 1, the second return path section 40 connects the write shield 16 and the main pole 15 to each other so that a second space S2 is defined by the main pole 15, the gap part 17 (the gap layer 19), the write shield 16, the first coupling layer 46, the second coupling layer 47 and the yoke part 41 (the magnetic layers 42 to 45), and thereby magnetically couples the write shield 16 and the main pole 15 to each other.

The first and second coupling layers 46 and 47 magnetically couple the first shield 16A of the write shield 16 to the yoke part 41 (the magnetic layer 42). The first coupling layer 46 is connected to the first shield 16A. The second coupling layer 47 magnetically couples the first coupling layer 46 to the yoke part 41 (the magnetic layer 42). The first coupling layer 46 has the end face 46a that is located in the medium facing surface 2 at a position forward of the first end face portion 16Aa of the first shield 16A along the direction T of travel of the recording medium. In the main cross section, the magnetic layer 42 is greater than the first shield 16A in length in the direction perpendicular to the medium facing surface 2. In the main cross section, each of the first and second coupling layers 46 and 47 is greater than the first shield 16A and smaller than the magnetic layer 42 in length in the direction perpendicular to the medium facing surface 2. In the main cross section, the second coupling layer 47 is smaller than the first coupling layer 46 in length in the direction perpendicular to the medium facing surface 2, and is greater than the first coupling layer 46 in length in the direction perpendicular to the top surface 1a of the substrate 1.

Neither the second coupling layer 47 nor the magnetic layer 42 is exposed in the medium facing surface 2. The second coupling layer 47 has the end face 47a facing toward the medium facing surface 2 and located away from the medium facing surface 2. The magnetic layer 42 has an end face (the first end face 41a of the yoke part 41) facing toward the medium facing surface 2 and located away from the medium facing surface 2. Part of the insulating layer 68 is interposed between the end face 47a of the second coupling layer 47 and the medium facing surface 2. Part of the insulating layer 70 is interposed between the aforementioned end face of the magnetic layer 42 (the first end face 41a of the yoke part 41) and the medium facing surface 2.

The first and second portions 10 and 20 of the coil will now be described in detail with reference to FIG. 3 to FIG. 6. FIG. 3 is a plan view showing the second layer 12 of the first portion 10. The second layer 12 is wound around the magnetic layer 33 which constitutes part of the first return path section 30. The second layer 12 includes two or more second coil elements that extend to pass between the second coupling layer 37 and the magnetic layer 33, in particular, within the first space S1. Note that the coil elements refer to part of the coil winding. In this embodiment, in particular, the second layer 12 is wound approximately two turns around the magnetic layer 33, and includes two second coil elements 12A and 12B that extend to pass between the second coupling layer 37 and the magnetic layer 33, in particular, within the first space S1. The second coil elements 12A and 12B are aligned in the direction perpendicular to the medium facing surface 2, in this order as viewed from the medium facing surface 2. The second layer 12 has a coil connection part 12E electrically connected to the first layer 11.

FIG. 4 is a plan view showing the first layer 11 of the first portion 10. The first layer 11 is wound one turn around the magnetic layer 34 which constitutes part of the first return path section 30. The first layer 11 includes a single first coil element 11A that extends to pass between the first coupling layer 36 and the magnetic layer 34, in particular, within the first space S1. The first layer 11 has a coil connection part 11S penetrating the insulating layer 56 and the insulating film 57 and electrically connected to the coil connection part 12E of the second layer 12, and a coil connection part 11E electrically connected to the second portion 20.

FIG. 5 is a plan view showing the first layer 21 of the second portion 20. The first layer 21 is wound one turn around the magnetic layer 44 which constitutes part of the second return path section 40. The first layer 21 includes a single first coil element 21A that extends to pass between the first coupling layer 46 and the magnetic layer 44, in particular, within the second space S2. The first layer 21 has a coil connection part 21S electrically connected to the coil connection part 11E of the first layer 11 of the first portion 10, and a coil connection part 21E electrically connected to the second layer 22. The coil connection part 21S is electrically connected to the coil connection part 11E via a connection layer (not shown) of columnar shape that penetrates a plurality of layers interposed between the first layer 21 and the first layer 11. The connection layer is made of a conductive material such as copper.

FIG. 6 is a plan view showing the second layer 22 of the second portion 20. The second layer 22 is wound around the magnetic layer 43 which constitutes part of the second return path section 40. The second layer 22 includes two or more second coil elements that extend to pass between the second coupling layer 47 and the magnetic layer 43, in particular, within the second space S2. In this embodiment, in particular, the second layer 22 is wound approximately two turns around the magnetic layer 43, and includes two second coil elements 22A and 22B that extend to pass between the second coupling layer 47 and the magnetic layer 43, in particular, within the second space S2. The second coil elements 22A and 22B are aligned in the direction perpendicular to the medium facing surface 2, in this order as viewed from the medium facing surface 2. The second layer 22 has a coil connection part 22S penetrating the insulating layer 65 and the insulating film 66 and electrically connected to the coil connection part 21E of the first layer 21. In the example shown in FIG. 3 to FIG. 6, the first portion 10 and the second portion 20 are connected in series.

In the first portion 10, the first coil element 11A is disposed with the first coupling layer 36 interposed between the medium facing surface 2 and the first coil element 11A. The two second coil elements 12A and 12B are disposed with the second coupling layer 37 interposed between the medium facing surface 2 and the two second coil elements 12A and 12B, and with the first coil element 11A interposed between the main pole 15 and the two second coil elements 12A and 12B. The two second coil elements 12A and 12B are aligned in the direction perpendicular to the medium facing surface 2. In the main cross section, each of the two second coil elements 12A and 12B is smaller than the first coil element 11A in length in the direction perpendicular to the medium facing surface 2, and is greater than the first coil element 11A in length in the direction perpendicular to the top surface 1a of the substrate 1.

In the second portion 20, the first coil element 21A is disposed with the first coupling layer 46 interposed between the medium facing surface 2 and the first coil element 21A. The two second coil elements 22A and 22B are disposed with the second coupling layer 47 interposed between the medium facing surface 2 and the two second coil elements 22A and 22B, and with the first coil element 21A interposed between the main pole 15 and the two second coil elements 22A and 22B. The two second coil elements 22A and 22B are aligned in the direction perpendicular to the medium facing surface 2. In the main cross section, each of the two second coil elements 22A and 22B is smaller than the first coil element 21A in length in the direction perpendicular to the medium facing surface 2, and is greater than the first coil element 21A in length in the direction perpendicular to the top surface 1a of the substrate 1.

The heater 82, the expansion layer 84, and the sensor 85 will be described in detail below. The expansion layer 84 and the sensor 85 are disposed between the read head unit 8 and the write head unit 9. Relative to the expansion layer 84 and the sensor 85, the heater 82 is located backward along the direction T of travel of the recording medium (i.e., located on the leading end side). The nonmagnetic part 86 is disposed around the expansion layer 84 and the sensor 85.

First, a description will be given of the heater 82 and the expansion layer 84. The heater 82 and the expansion layer 84 are provided to allow part of the medium facing surface 2 to protrude in order to reduce the distance from the read head unit 8 and the write head unit 9 to the surface of the recording medium. The heater 82 generates heat for causing part of the medium facing surface 2 to protrude. The expansion layer 84 expands with the heat generated by the heater 82, and thereby makes part of the medium facing surface 2 protrude.

The heater 82 is made of a conductive material, such as metal, which generates heat by being energized. For example, the heater 82 is formed of a film of NiCr or a layered film consisting of Ta, NiCu, and Ta films.

The expansion layer 84 is made of a material that has a higher thermal conductivity and a higher coefficient of linear thermal expansion than those of the material of the nonmagnetic part 86. If the nonmagnetic part 86 is made of alumina, the expansion layer 84 needs to be made of a material that has a higher thermal conductivity and a higher coefficient of linear thermal expansion than those of alumina. At 25° C., alumina has a thermal conductivity of around 30 W/m·K. In the range of 25° C. to 100° C., alumina has a coefficient of linear thermal expansion of around $6.5 \times 10^{-6}$/° C. The expansion layer 84 may be made of a metal material. The metal material to form the expansion layer 84 may be either a nonmagnetic metal material or a magnetic metal material. Examples of nonmagnetic metal materials that can be used to form the expansion layer 84 include Al, Cu, and Au. Examples of magnetic metal materials that can be used to form the expansion layer 84 include CoFeN, CoNiFe, NiFe, and CoFe.

A description will now be given of a method for reducing the distance from the read head unit 8 and the write head unit 9 to the surface of the recording medium by using the heater 82 and the expansion layer 84. An electric current of predetermined magnitude is passed through the heater 82. This causes the heater 82 to generate heat for causing part of the medium facing surface 2 to protrude.

The components of the magnetic head expand with the heat generated by the heater 82. The expansion layer 84 is made of a material that has a thermal conductivity higher than that of the material of the nonmagnetic part 86 surrounding the expansion layer 84, in particular. The heat generated by the heater 82 is therefore distributed within the expansion layer 84 more rapidly and uniformly than in the nonmagnetic part 86. Furthermore, the material of the expansion layer 84 has a coefficient of linear thermal expansion higher than that of the material of the nonmagnetic part 86. With the heat generated by the heater 82, the expansion layer 84 therefore expands more rapidly and greatly than the nonmagnetic part 86 does, thereby causing part of the medium facing surface 2 to protrude. This reduces the distance from the read head unit 8 and the write head unit 9 to the surface of the recording medium. The amount of protrusion of the part of the medium facing surface 2 can be adjusted by adjusting the magnitude of the electric current passed through the heater 82.

Next, the sensor 85 will be described. The sensor 85 is intended to detect contact of part of the medium facing surface 2 with the recording medium. The sensor 85 is a resistor that varies in resistance with a change in its own temperature when part of the medium facing surface 2 makes contact with the recording medium. The sensor 85 is made of a metal material or a semiconductor material that varies in resistance at a considerable rate with respect to a change in temperature, i.e., that has a considerable temperature coefficient of resistance. Specific examples of the material of the sensor 85 include NiFe, W, Cu, Ni, and Pt.

When part of the medium facing surface 2 comes into contact with the recording medium, the frictional heat resulting from the contact raises the temperature of the medium facing surface 2 at and in the vicinity of the part in contact with the recording medium. Such a rise in temperature also raises the temperature of the sensor 85 itself. As a result, the sensor 85 varies in resistance. The resistance of the sensor 85 can thus be measured to detect the contact of part of the medium facing surface 2 with the recording medium.

The shape of the main pole 15 will now be described in detail with reference to FIG. 7. As shown in FIG. 7, the main pole 15 includes a track width defining portion 15A and a wide portion 15B. The track width defining portion 15A has an end face located in the medium facing surface 2, and an end opposite to the end face. The wide portion 15B is connected to the end of the track width defining portion 15A. As shown in FIG. 7, the main pole 15 has: the bottom end 15L which is the end closer to the top surface 1a of the substrate 1; the top surface 15T opposite to the bottom end 15L; the first side part SP1; and the second side part SP2. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 2. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 2, then becoming constant. Here, the length of the track width defining portion 15A in the direction perpendicular to the medium facing surface 2 will be referred to as neck height. The neck height falls within the range of 0 to 0.3 μm, for example. A zero neck height means that no track width defining portion 15A exists and an end face of the wide portion 15B is thus located in the medium facing surface 2.

The bottom end 15L includes a first portion 15L1, a second portion 15L2, and a third portion 15L3 that are contiguously arranged in order of increasing distance from the medium facing surface 2. The first portion 15L1 has an end located in the medium facing surface 2. Each of the first and second portions 15L1 and 15L2 may be an edge formed by two intersecting planes, or may be a plane connecting two planes to each other. The third portion 15L3 is a plane extending in a direction substantially perpendicular to the medium facing surface 2. The top surface 15T includes a fourth portion 15T1, a fifth portion 15T2, and a sixth portion 15T3 that are contiguously arranged in order of increasing distance from the medium facing surface 2. The fourth portion 15T1 has an end located in the medium facing surface 2.

The distance from the top surface 1a of the substrate 1 to any given point on each of the first and second portions 15L1 and 15L2 decreases with increasing distance from the given point to the medium facing surface 2. The angle of inclination of the second portion 15L2 with respect to the direction perpendicular to the medium facing surface 2 is greater than the angle of inclination of the first portion 15L1 with respect to the direction perpendicular to the medium facing surface 2.

The second shield 16B has a top surface that is opposed to the first and second portions 15L1 and 15L2 with the gap part 17 (the first gap layer 18) interposed therebetween. The distance from the top surface 1a of the substrate 1 to any given point on the top surface of the second shield 16B decreases with increasing distance from the given point to the medium facing surface 2.

The distance from the top surface 1a of the substrate 1 to any given point on each of the fourth and fifth portions 15T1 and 15T2 increases with increasing distance from the given point to the medium facing surface 2. The angle of inclination of the fifth portion 15T2 with respect to the direction perpendicular to the medium facing surface 2 is greater than the angle of inclination of the fourth portion 15T1 with respect to the direction perpendicular to the medium facing surface 2. The sixth portion 15T3 extends in the direction substantially perpendicular to the medium facing surface 2. The first shield 16A has a bottom surface that is opposed to the fourth and fifth portions 15T1 and 15T2 with the gap part 17 (the second gap layer 19) interposed therebetween. The distance from the top surface 1a of the substrate 1 to any given point on the bottom surface of the first shield 16A increases with increasing distance from the given point to the medium facing surface 2.

Both the angle of inclination of the first portion 15L1 and the angle of inclination of the fourth portion 15T1 preferably fall within the range of 15° to 45°. Both the angle of inclination of the second portion 15L2 and the angle of inclination of the fifth portion 15T2 preferably fall within the range of 45° to 85°.

As shown in FIG. 7, the end face of the main pole 15 located in the medium facing surface 2 has a first side A1 adjacent to the second gap layer 19, a second side A2 connected to a first end of the first side A1, and a third side A3 connected to a second end of the first side A1. The first side A1 defines the track width. The position of an end of a record bit to be recorded on the recording medium depends on the position of the first side A1. The end face of the main pole 15 located in the medium facing surface 2 decreases in width in the track width direction TW with increasing proximity to the bottom end 15L of the main pole 15, that is, with increasing proximity to the top surface 1a of the substrate 1. Each of the second side A2 and the third side A3 is at an angle in the range of, for example, 7° to 17°, or preferably in the range of 10° to 15°, with respect to the direction perpendicular to the top surface of the substrate 1. The first side A1 has a length in the range of 0.05 to 0.20 µm, for example.

The thickness (length in the direction perpendicular to the top surface 1a of the substrate 1) of the main pole 15 at the medium facing surface 2 falls within the range of 0.05 to 0.2 µm, for example. The distance between the third portion 15L3 and the sixth portion 15T3 falls within the range of 0.4 to 0.8 µm, for example.

FIG. 7 shows an example where the distance from the medium facing surface 2 to the boundary between the second portion 15L2 and the third portion 15L3, and the distance from the medium facing surface 2 to the boundary between the fifth portion 15T2 and the sixth portion 15T3, are both equal to the neck height, i.e., the distance from the medium facing surface 2 to the boundary between the track width defining portion 15A and the wide portion 15B. Nevertheless, the distance from the medium facing surface 2 to the boundary between the second portion 15L2 and the third portion 15L3, and the distance from the medium facing surface 2 to the boundary between the fifth portion 15T2 and the sixth portion 15T3, may each be smaller or greater than the neck height.

The function and effects of the magnetic head according to the embodiment will now be described. In the magnetic head, the write head unit 9 writes data on the recording medium, and the read head unit 8 reads data written on the recording medium. In the write head unit 9, the coil including the first and second portions 10 and 20 produces magnetic fields corresponding to data to be written on the recording medium. A magnetic flux corresponding to the magnetic field produced by the first portion 10 passes through the first return path section 30 and the main pole 15. A magnetic flux corresponding to the magnetic field produced by the second portion 20 passes through the second return path section 40 and the main pole 15. Consequently, the main pole 15 allows the magnetic flux corresponding to the magnetic field produced by the first portion 10 and the magnetic flux corresponding to the magnetic field produced by the second portion 20 to pass.

The first and second portions 10 and 20 may be connected in series or in parallel. In either case, the first and second portions 10 and 20 are connected such that the magnetic flux corresponding to the magnetic field produced by the first portion 10 and the magnetic flux corresponding to the magnetic field produced by the second portion 20 flow in the same direction through the main pole 15.

The main pole 15 allows the magnetic fluxes corresponding to the magnetic fields produced by the coil to pass as mentioned above, and produces a write magnetic field for writing data on the recording medium by means of the perpendicular magnetic recording system.

The write shield 16 captures a disturbance magnetic field applied to the magnetic head from the outside thereof. This allows preventing erroneous writing on the recording medium induced by the disturbance magnetic field intensively captured into the main pole 15. The write shield 16 also functions to capture a magnetic flux that is produced from the end face of the main pole 15 and that expands in directions other than the direction perpendicular to the plane of the recording medium, and to thereby prevent the magnetic flux from reaching the recording medium.

The write shield 16 and the first and second return path sections 30 and 40 function to allow a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the write shield 16 and the first return path section 30. Another part of the magnetic flux that has been produced from the end face of the main pole 15 and has magnetized the recording medium flows back to the main pole 15 through the write shield 16 and the second return path section 40.

The write shield 16 includes the first shield 16A, the second shield 16B, and the two side shields 16C and 16D. This embodiment thus makes it possible that, in regions both backward and forward of the end face of the main pole 15 along the direction T of travel of the recording medium and regions on opposite sides of the end face of the main pole 15 in the track width direction TW, a magnetic flux that is produced from the end face of the main pole 15 and expands in directions other than the direction perpendicular to the plane of the recording medium can be captured and thereby prevented from reaching the recording medium. Consequently, the embodiment allows preventing the skew-induced adjacent track erase. The first shield 16A and the second shield 16B contribute to an increase in the gradient of the write magnetic field, as well as the prevention of the skew-induced adjacent track erase. The side shields 16C and 16D greatly contribute to the prevention of adjacent track erase, in particular. According to the embodiment, such functions of the write shield 16 serve to increase the recording density.

Furthermore, as shown in FIG. 7, this embodiment is configured so that in the medium facing surface 2, the distance between the first and second side parts SP1 and SP2 of the main pole 15 in the track width direction TW, i.e., the width of the end face of the main pole 15, decreases with increasing proximity to the top surface 1a of the substrate 1. According to the embodiment, this feature also serves to prevent the skew-induced adjacent track erase.

The embodiment is also configured so that in the medium facing surface 2, the distance between the first and second sidewalls of the side shields 16C and 16D in the track width direction TW decreases with increasing proximity to the top surface 1a of the substrate 1, as does the distance between the first and second side parts SP1 and SP2 of the main pole 15. The embodiment thus makes it possible that the distance between the first side part SP1 and the first sidewall and the distance between the second side part SP2 and the second sidewall are both small and constant in the medium facing surface 2. This configuration allows the side shields 16C and 16D to effectively capture the magnetic flux that is produced from the end face of the main pole 15 and expands to opposite sides in the track width direction TW. As a result, the embodiment can enhance the function of the side shields 16C and 16D in particular, and thereby prevent the skew-induced adjacent track erase more effectively.

The write shield 16 cannot capture much magnetic flux if the write shield 16 is not magnetically connected with any magnetic layer having a sufficiently large volume enough to accommodate the magnetic flux captured by the write shield 16. In this embodiment, there are provided the first return path section 30 (the yoke part 31, the first coupling layer 36, and the second coupling layer 37) which magnetically couples the second shield 16B of the write shield 16 and the main pole 15 to each other, and the second return path section 40 (the yoke part 41, the first coupling layer 46, and the second coupling layer 47) which magnetically couples the first shield 16A of the write shield 16 and the main pole 15 to each other. Such a configuration allows the magnetic flux captured by the write shield 16 to flow into the main pole 15 by way of the first and second return path sections 30 and 40. In this embodiment, the first and second return path sections 30 and 40 and the main pole 15, which are magnetic layers large in volume, are magnetically connected to the write shield 16. This allows the write shield 16 to capture much magnetic flux, so that the above-described effect of the write shield 16 can be exerted effectively.

Furthermore, in this embodiment, the second shield 16B is provided in addition to the first return path section 30. In the main cross section, the magnetic layer 32, which is located farthest from the main pole 15 among the magnetic layers that constitute the first return path section 30, is greater than the second shield 16B in length in the direction perpendicular to the medium facing surface 2. The first portion 10 of the coil passes through the space S1. Such a structure is more advantageous than a structure where the magnetic layer 32 also serves as the second shield. More specifically, according to this embodiment, it is possible to bring the second shield 16B and the main pole 15 into sufficiently close proximity to each other. This enhances the function of the second shield 16B.

Now, a description will be made as to the role of the first and second coupling layers 36 and 37. First, suppose a case where there are not provided the first and second coupling layers 36 and 37 so that the second shield 16B and the yoke part 31 are not magnetically coupled to each other. In this case, the magnetic flux that has been captured by the second shield 16B or the side shields 16C and 16D and directed downward cannot flow toward the yoke part 31 (the magnetic layer 32), and thus returns so as to proceed upward. This causes the second shield 16B or the side shields 16C and 16D to produce upwardly and downwardly directed magnetic fluxes. As a result, part of the magnetic flux captured by the second shield 16B or the side shields 16C and 16D leaks out of the medium facing surface 2. This may cause adjacent track erase. In contrast to this, if the second shield 16B and the yoke part 31 (the magnetic layer 32) are magnetically coupled to each other by the first and second coupling layers 36 and 37, the magnetic flux captured by the side shields 16C and 16D is divided into an upward flux and a downward flux, and the magnetic flux captured by the second shield 16B flows mainly downward. This can prevent the adjacent track erase that may be caused by part of the magnetic flux captured by the second shield 16B or the side shields 16C and 16D being leaked out of the medium facing surface 2.

The above description relating to the first and second coupling layers 36 and 37 also applies to the first and second coupling layers 46 and 47. More specifically, if the first shield 16A and the yoke part 41 (the magnetic layer 42) are magnetically coupled to each other by the first and second coupling layers 46 and 47, the magnetic flux captured by the side shields 16C and 16D is divided into an upward flux and a downward flux, and the magnetic flux captured by the first shield 16A flows mainly upward. This can prevent the adjacent track erase that may be caused by part of the magnetic flux captured by the first shield 16A or the side shields 16C and 16D being leaked out of the medium facing surface 2.

If the second shield 16B is excessively long in the direction perpendicular to the medium facing surface 2 in the main cross section, flux leakage from the main pole 15 to the second shield 16B increases and the main pole 15 thus becomes unable to direct much magnetic flux to the medium facing surface 2. It is therefore necessary that the second shield 16B is not excessively long in the direction perpendicular to the medium facing surface 2 in the main cross section. In the main cross section, if the length of each of the first and second coupling layers 36 and 37 in the direction perpendicular to the medium facing surface 2 is equal to or smaller than that of the second shield 16B, the first and second coupling layers 36 and 37 cannot direct much magnetic flux from the second shield 16B to the yoke part 31. In this embodiment, in contrast, the first and second coupling layers 36 and 37 are configured so that in the main cross section, the length of each of the first and second coupling layers 36 and 37 in the direction perpendicular to the medium facing surface 2 is greater than that of the second shield 16B and smaller than that of the magnetic layer 32. Consequently, according to the embodiment, the first and second coupling layers 36 and 37 can direct much magnetic flux from the second shield 16B to the magnetic layer 32 (the yoke part 31).

Likewise, in this embodiment, the first and second coupling layers 46 and 47 are configured so that in the main cross section, the length of each of the first and second coupling layers 46 and 47 in the direction perpendicular to the medium facing surface 2 is greater than that of the first shield 16A and smaller than that of the magnetic layer 42. Consequently, according to the embodiment, the first and second coupling layers 46 and 47 can direct much magnetic flux from the first shield 16A to the magnetic layer 42 (the yoke part 41).

The first and second coupling layers 36 and 37 are disposed between the medium facing surface 2 and the first portion 10 of the coil. If the end faces of the first and second coupling layers 36 and 37 are exposed over a large area in the medium facing surface 2, the heat generated by the first portion 10 of the coil may cause the first and second coupling layers 36 and 37 to expand, and this may cause the end faces of the first and second coupling layers 36 and 37, which are part of the medium facing surface 2, to protrude.

In this embodiment, the second coupling layer 37 has the end face 37a facing toward the medium facing surface 2 and located away from the medium facing surface 2. This serves to prevent undesirable protrusion of part of the medium facing surface 2 from being caused by the second coupling layer 37 and the first portion 10 (the second layer 12) of the coil. In this embodiment, in particular, the insulating layer 55 made of an inorganic insulating material that has a smaller coefficient of linear thermal expansion and a higher Vickers hardness than those of the magnetic material used to form the second coupling layer 37 is present between the end face 37a of the second coupling layer 37 and the medium facing surface 2. The insulating layer 55 exists over a larger area than the second coupling layer 37 does. The insulating layer 55 therefore functions to suppress a change in level of the second coupling layer 37 caused by the heat generated by the first portion 10 (the second layer 12) of the coil. Consequently, according to the embodiment, it is possible to more effectively prevent undesirable protrusion of part of the medium facing surface 2 from being caused by the second coupling layer 37 and the first portion 10 (the second layer 12) of the coil.

The above description relating to the second coupling layer 37 and the first portion 10 (the second layer 12) of the coil also applies to the second coupling layer 47, which constitutes part of the second return path section 40, and the second portion 20 (the second layer 22) of the coil. More specifically, in this embodiment, the second coupling layer 47 has the end face 47a facing toward the medium facing surface 2 and located away from the medium facing surface 2. This serves to prevent undesirable protrusion of part of the medium facing surface 2 from being caused by the second coupling layer 47 and the second portion 20 (the second layer 22) of the coil. In this embodiment, in particular, the insulating layer 68 made of an inorganic insulating material that has a smaller coefficient of linear thermal expansion and a higher Vickers hardness than those of the magnetic material used to form the second coupling layer 47 is present between the end face 47a of the second coupling layer 47 and the medium facing surface 2. The insulating layer 68 exists over a larger area than the second coupling layer 47 does. The insulating layer 68 therefore functions to suppress a change in level of the second coupling layer 47 caused by the heat generated by the second portion 20 (the second layer 22) of the coil. Consequently, according to the embodiment, it is possible to more effectively prevent undesirable protrusion of part of the medium facing surface 2 from being caused by the second coupling layer 47 and the second portion 20 (the second layer 22) of the coil.

According to the embodiment, since it is possible to prevent undesirable protrusion of part of the medium facing surface 2 from being caused by the second coupling layer 37 and the first portion 10 (the second layer 12) of the coil as described above, there is no need to, for example, reduce the second coupling layer 37 in length in the direction perpendicular to the top surface 1a of the substrate 1 in order to reduce the area of the end face 37a of the second coupling layer 37. In this embodiment, in the main cross section, the second coupling layer 37 is smaller than the first coupling layer 36 in length in the direction perpendicular to the medium facing surface 2, and is greater than the first coupling layer 36 in length in the direction perpendicular to the top surface 1a of the substrate 1.

Likewise, since it is possible according to the embodiment to prevent undesirable protrusion of part of the medium facing surface 2 from being caused by the second coupling layer 47 and the second portion 20 (the second layer 22) of the coil as described above, there is no need to, for example, reduce the second coupling layer 47 in length in the direction perpendicular to the top surface 1a of the substrate 1 in order to reduce the area of the end face 47a of the second coupling layer 47. In this embodiment, in the main cross section, the second coupling layer 47 is smaller than the first coupling layer 46 in length in the direction perpendicular to the medium facing surface 2, and is greater than the first coupling layer 46 in length in the direction perpendicular to the top surface 1a of the substrate 1.

To obtain a higher recording density, the frequency of a recording signal is increased. Accordingly, the magnetic head is required to achieve a higher rate of change in the direction of the magnetic flux produced from the end face of the main pole 15. To address this requirement, it is effective to reduce the lengths of the magnetic paths passing through the write shield 16 and the main pole 15, i.e., the length of the magnetic path passing through the second shield 16B, the first return path section 30 and the main pole 15, and the length of the magnetic path passing through the first shield 16A, the second return path section 40 and the main pole 15. For the reasons described below, it is possible according to the embodiment to reduce the magnetic path length of the first return path section 30 and the magnetic path length of the second return path section 40.

The first coupling layer 36 has the end face 36a located in the medium facing surface 2. To prevent undesirable protrusion of part of the medium facing surface 2 from being caused by the first coupling layer 36 and the first portion 10 (the first layer 11) of the coil, it is effective to reduce the first coupling layer 36 in length in the direction perpendicular to the top surface 1a of the substrate 1 so that the end face 36a of the first coupling layer 36 located in the medium facing surface 2 is reduced in area. According to this embodiment, it is possible to dispose the first coil element 11A in a narrow space between the main pole 15 and the two second coil elements 12A and 12B, while allowing the first coupling layer 36 to be reduced in length in the direction perpendicular to the top surface 1a of the substrate 1 and thereby allowing the end face 36a of the first coupling layer 36 to be reduced in area. More specifically, in this embodiment, only a single first coil element 11A is disposed between the main pole 15 and the two second coil elements 12A and 12B. This configuration allows the first coil element 11A to be increased in length in the direction perpendicular to the medium facing surface 2 to thereby reduce the resistance of the first coil element 11A, even though the first coupling layer 36 and the first coil element 11A are small in length in the direction perpendicular to the top surface 1a of the substrate 1. Consequently, according to the embodiment, the first coil element 11A can be disposed even in a narrow space as described above.

Thus, according to this embodiment, the first space S1 defined by the main pole 15, the gap part 17 (the first gap layer 18), the write shield 16, the first coupling layer 36, the second coupling layer 37 and the yoke part 31 can be efficiently used to dispose the first portion 10 of the coil. This makes it possible to reduce the magnetic path length of the first return path section 30.

The above description relating to the first return path section 30 also applies to the second return path section 40. More specifically, the first coupling layer 46 has the end face 46a located in the medium facing surface 2. To prevent undesirable protrusion of part of the medium facing surface 2 from being caused by the first coupling layer 46 and the second portion 20 (the first layer 21) of the coil, it is effective to reduce the first coupling layer 46 in length in the direction perpendicular to the top surface 1a of the substrate 1 so that the end face 46a of the first coupling layer 46 located in the medium facing surface 2 is reduced in area. According to this embodiment, it is possible to dispose the first coil element 21A in a narrow space between the main pole 15 and the two second coil elements 22A and 22B, while allowing the first coupling layer 46 to be reduced in length in the direction perpendicular to the top surface 1a of the substrate 1 and thereby allowing the end face 46a of the first coupling layer 46 to be reduced in area. More specifically, in this embodiment, only a single first coil element 21A is disposed between the main pole 15 and the two second coil elements 22A and 22B. This configuration allows the first coil element 21A to be increased in length in the direction perpendicular to the medium facing surface 2 to thereby reduce the resistance of the first coil element 21A, even though the first coupling layer 46 and the first coil element 21A are small in length in the direction perpendicular to the top surface 1a of the substrate 1. Consequently, according to the embodiment, the first coil element 21A can be disposed even in a narrow space as described above.

Thus, according to this embodiment, the second space S2 defined by the main pole 15, the gap part 17 (the second gap layer 19), the write shield 16, the first coupling layer 46, the second coupling layer 47 and the yoke part 41 can be efficiently used to dispose the second portion 20 of the coil. This makes it possible to reduce the magnetic path length of the second return path section 40.

Consequently, according to this embodiment, it is possible to prevent undesirable protrusion of part of the medium facing surface 2 from being caused by the first and second coupling layers 36 and 37 constituting part of the first return path section 30, the first portion 10 of the coil, the first and second coupling layers 46 and 47 constituting part of the second return path section 40, and the second portion 20 of the coil. It is also possible to reduce the magnetic path lengths of the first and second return path sections 30 and 40.

In the embodiment, the two second coil elements 12A and 12B are aligned in the direction perpendicular to the medium facing surface 2, as already described. This allows the second layer 12 including the two second coil elements 12A and 12B to be patterned more easily, as compared with the case where the two second coil elements 12A and 12B are aligned in the direction perpendicular to the top surface 1a of the substrate 1.

Likewise, in the embodiment, the two second coil elements 22A and 22B are aligned in the direction perpendicular to the medium facing surface 2, as already described. This allows the second layer 22 including the two second coil elements 22A and 22B to be patterned more easily, as compared with the case where the two second coil elements 22A and 22B are aligned in the direction perpendicular to the top surface 1a of the substrate 1.

The other effects provided by the embodiment will now be described. In this embodiment, the bottom end 15L of the main pole 15 includes the first portion 15L1, the second portion 15L2, and the third portion 15L3 that are contiguously arranged in order of increasing distance from the medium facing surface 2. The top surface 15T of the main pole 15 includes the fourth portion 15T1, the fifth portion 15T2, and the sixth portion 15T3 that are contiguously arranged in order of increasing distance from the medium facing surface 2. The distance from the top surface 1a of the substrate 1 to any given point on each of the first and second portions 15L1 and 15L2 decreases with increasing distance from the given point to the medium facing surface 2. The distance from the top surface 1a of the substrate 1 to any given point on each of the fourth and fifth portions 15T1 and 15T2 increases with increasing distance from the given point to the medium facing surface 2. Consequently, the embodiment allows the main pole 15 to have a small thickness in the medium facing surface 2. It is thus possible to prevent the skew-induced adjacent track erase. The embodiment further allows the main pole 15 to have a great thickness in the part away from the medium facing surface 2. This allows the main pole 15 to direct much magnetic flux to the medium facing surface 2, and consequently allows improving write characteristics such as overwrite property.

In the main pole 15 of this embodiment, the angles of inclination of the first and fourth portions 15L1 and 15T1 can be reduced to thereby suppress variations in write characteristics associated with changes in level of the medium facing surface 2. Furthermore, in the main pole 15, the angles of inclination of the second and fifth portions 15L2 and 15T2 can be increased to thereby provide a great distance between the third portion 15L3 and the sixth portion 15T3 while achieving a small thickness of the main pole 15 in the medium facing surface 2. This allows preventing the skew-induced problems and improving write characteristics. Consequently, according to this embodiment, it is possible to prevent the skew-induced problems and to improve write characteristics while suppressing variations in write characteristics associated with changes in level of the medium facing surface 2.

The present invention is not limited to the foregoing embodiment, and various modifications may be made thereto. For example, so long as the requirements of the claims are satisfied, there may be provided any number of second coil elements other than the example illustrated in the foregoing embodiment.

The magnetic head may be provided with either one of the first and second return path sections 30 and 40. Alternatively, the magnetic head may be provided with the first and second return path sections 30 and 40, and either one of the first and second return path sections 30 and 40 may have a yoke part, a first coupling layer, and a second coupling layer.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A magnetic head for perpendicular magnetic recording, comprising:
   a medium facing surface that faces a recording medium;
   a coil that produces a magnetic field corresponding to data to be written on the recording medium;
   a main pole that has an end face located in the medium facing surface, allows a magnetic flux corresponding to the magnetic field produced by the coil to pass, and produces a write magnetic field for writing the data on the recording medium by means of a perpendicular magnetic recording system;
   a write shield made of a magnetic material and having an end face located in the medium facing surface;
   a gap part made of a nonmagnetic material and disposed between the main pole and the write shield;
   a return path section made of a magnetic material and connecting a part of the main pole away from the medium facing surface to the write shield; and a substrate having a top surface, wherein:
the coil, the main pole, the write shield, the gap part, and the return path section are disposed above the top surface of the substrate;
the end face of the write shield includes a first end face portion that is located forward of the end face of the main pole along a direction of travel of the recording medium;
the return path section includes a yoke part, a first coupling layer, and a second coupling layer;
the yoke part has a first end face facing toward the medium facing surface and located away from the medium facing surface, and a second end face located away from the medium facing surface and in contact with the main pole;
the first coupling layer is connected to the write shield and has an end face located in the medium facing surface;
the second coupling layer magnetically couples the first coupling layer to the yoke part, and has an end face facing toward the medium facing surface and located away from the medium facing surface;
the coil includes a first coil element and a plurality of second coil elements, each of the first and second coil elements extending to pass through a space defined by the main pole, the gap part, the write shield, the first coupling layer, the second coupling layer, and the yoke part;
the first coil element is disposed with the first coupling layer interposed between the medium facing surface and the first coil element; and
the second coil elements are disposed with the second coupling layer interposed between the medium facing surface and the second coil elements, and with the first coil element interposed between the main pole and the second coil elements, the second coil elements being aligned in a direction perpendicular to the medium facing surface.

2. The magnetic head for perpendicular magnetic recording according to claim 1, wherein:
in a cross section that intersects the end face of the main pole located in the medium facing surface and that is perpendicular to the medium facing surface and the top surface of the substrate, the second coupling layer is smaller than the first coupling layer in length in the direction perpendicular to the medium facing surface, and is greater than the first coupling layer in length in a direction perpendicular to the top surface of the substrate; and
in the cross section, each of the second coil elements is smaller than the first coil element in length in the direction perpendicular to the medium facing surface, and is greater than the first coil element in length in the direction perpendicular to the top surface of the substrate.

3. The magnetic head for perpendicular magnetic recording according to claim 1, further comprising an insulating layer made of an inorganic insulating material, the insulating layer including a portion interposed between the end face of the second coupling layer and the medium facing surface.

4. The magnetic head for perpendicular magnetic recording according to claim 1, wherein the end face of the write shield further includes a second, a third, and a fourth end face portion, the second end face portion being located backward of the end face of the main pole along the direction of travel of the recording medium, the third and fourth end face portions being located on opposite sides of the end face of the main pole in a track width direction.

5. A magnetic head for perpendicular magnetic recording, comprising:
a medium facing surface that faces a recording medium;
a coil that produces a magnetic field corresponding to data to be written on the recording medium;
a main pole that has an end face located in the medium facing surface, allows a magnetic flux corresponding to the magnetic field produced by the coil to pass, and produces a write magnetic field for writing the data on the recording medium by means of a perpendicular magnetic recording system;
a write shield made of a magnetic material and having an end face located in the medium facing surface;
a gap part made of a nonmagnetic material and disposed between the main pole and the write shield;
a first return path section and a second return path section each made of a magnetic material, the first and second return path sections connecting a part of the main pole away from the medium facing surface to the write shield; and
a substrate having a top surface, wherein:
the coil, the main pole, the write shield, the gap part, the first return path section, and the second return path section are disposed above the top surface of the substrate;
the end face of the write shield includes a first end face portion that is located forward of the end face of the main pole along a direction of travel of the recording medium;
the first return path section and the second return path section are aligned along a direction perpendicular to the top surface of the substrate, with the main pole interposed between the first and second return path sections;
at least one of the first and second return path sections includes a yoke part, a first coupling layer, and a second coupling layer;
the yoke part has a first end face facing toward the medium facing surface and located away from the medium facing surface, and a second end face located away from the medium facing surface and in contact with the main pole;
the first coupling layer is connected to the write shield and has an end face located in the medium facing surface;
the second coupling layer magnetically couples the first coupling layer to the yoke part, and has an end face facing toward the medium facing surface and located away from the medium facing surface;
the coil includes a first coil element and a plurality of second coil elements, each of the first and second coil elements extending to pass through a space defined by the main pole, the gap part, the write shield, the first coupling layer, the second coupling layer, and the yoke part;
the first coil element is disposed with the first coupling layer interposed between the medium facing surface and the first coil element; and
the second coil elements are disposed with the second coupling layer interposed between the medium facing surface and the second coil elements, and with the first coil element interposed between the main pole and the second coil elements, the second coil elements being aligned in a direction perpendicular to the medium facing surface.

6. The magnetic head for perpendicular magnetic recording according to claim 5, wherein:
in a cross section that intersects the end face of the main pole located in the medium facing surface and that is perpendicular to the medium facing surface and the top surface of the substrate, the second coupling layer is smaller than the first coupling layer in length in the direction perpendicular to the medium facing surface, and is greater than the first coupling layer in length in the direction perpendicular to the top surface of the substrate; and in the cross section, each of the second coil elements is smaller than the first coil element in length in the direction perpendicular to the medium facing surface, and is greater than the first coil element in length in the direction perpendicular to the top surface of the substrate.

7. The magnetic head for perpendicular magnetic recording according to claim 5, further comprising an insulating layer made of an inorganic insulating material, the insulating layer including a portion interposed between the end face of the second coupling layer and the medium facing surface.

8. The magnetic head for perpendicular magnetic recording according to claim 5, wherein the end face of the write shield further includes a second, a third, and a fourth end face portion, the second end face portion being located backward of the end face of the main pole along the direction of travel of the recording medium, the third and fourth end face portions being located on opposite sides of the end face of the main pole in a track width direction.

* * * * *